United States Patent Office 3,590,090
Patented June 29, 1971

3,590,090
DEHYDROGENATION OF ORGANIC COMPOUNDS
Abraham D. Cohen, Israel S. Pasternak, and Noel J. Gaspar, Sarnia, Ontario, Canada, assignors to Esso Research and Engineering Company
No Drawing. Filed Dec. 2, 1968, Ser. No. 780,604
Int. Cl. C07c *15/10, 5/20*
U.S. Cl. 260—669                    17 Claims

ABSTRACT OF THE DISCLOSURE

Organic compounds having a dehydrogenatable carbon-carbon bond are dehydrogenated in the vapor phase by contact with a sulfur oxide and oxygen, the oxygen being present in an amount insufficient to cause substantial burning of the organic compound, the dehydrogenation being preferably carried out in the presence of a low surface area catalyst and an inert diluent.

FIELD OF THE INVENTION

This invention relates to a process for the vapor phase dehydrogenation of organic compounds. More particularly, this invention relates to an improved process for effecting the dehydrogenation of dehydrogenatable organic compounds, i.e., compounds having at least one

grouping wherein adjacent carbon atoms are bonded to each other and at least one hydrogen atom is bonded to each carbon atom, by contacting such compounds, in the vapor phase at elevated temperatures, with a sulfur oxide, i.e., sulfur dioxide, sulfur trioxide or water solutions thereof, and oxygen, the oxygen being present in an insufficient amount to cause substantial burning of the dehydrogenatable compound, the dehydrogenation being preferably carried out in the presence of a low surface area catalyst and an inert diluent.

PRIOR ART

The vapor phase dehydrogenation of organic compounds to produce unsaturated products, or products more highly unsaturated than the feedstock, in the presence of sulfur dioxide has long been known to the art, see for example, U.S. 2,126,817. Generally, the overall reaction for the sulfur dioxide dehydrogenation of a hydrocarbon feed is in accordance with the following generalized expression:

$$3C_nH_{2n+2} + SO_2 \rightarrow 3C_nH_{2n} + H_2S + 2H_2O \qquad (1)$$

which shows that one-third mole of sulfur dioxide is theoretically required to abstract one mole of hydrogen from the feedstock. While many such processes have been reported, the commercial development of a sulfur oxide dehydrogenation process has been rather permanently delayed due to serious problems involving coking in the reactor, short catalyst life, and burning, of the feedstock. Thus, while it is believed that dehydrogenation is the principal reaction occurring, a portion of the feedstock is simultaneously being burned and/or cracked with a resulting formation of coke in the reactor and on any catalyst that may be employed. Moreover, due to the loss of sulfur oxide in undesirable side-reactions with the hydrocarbon feed or product, i.e. reactions leading to the formation of carbon oxides, sulfur containing compounds, sulfur, etc., the sulfur oxides used to carry out the dehydrogenation process have been usually employed in amounts far exceeding the theoretical, e.g. equimolar, required for dehydrogenation thereby further contributing to the prodction of heavy products, i.e. undesirable sulfur-containing organic compounds, which not only reduce selectivity to the desired product but also rapidly deactivate the catalyst via coke formation. In co-pending application Ser. No. 780,528 filed of an even date herewith by Messrs. Pasternak, Cohen, Gaspar and Vadekar, a process has been described which tends to eliminate or substantially inhibit cracking and/or burning reactions and allow the use of sulfur oxide approaching the theoretical more closely than had been believed possible by the prior art for the conversions and yields obtained. The pertinent disclosures of Ser. No. 780,528 are, therefore, incorporated herein by reference. The present invention, however, represents a further advance over that reported in Ser. No. 780,528 and allows the use of even lower amounts of sulfur oxide, thereby further reducing any coking tendencies and permitting longer and more efficient run periods. Alternatively, at constant sulfur levels, the use of added oxygen will serve to increase yields and conversions. (At optimum conditions both credits can be realized.) However, it has been found that in addition to the mentioned advantages of low sulfur compound levels, selectivity to the desired dehydrogenation products is also increased. The use of oxygen in conjunction with sulfur oxide dehydrogenation reactions to increase conversions, yields and catalyst life is particularly unexpected in view of the disclosure in U.S. 3,299,155 wherein it is specifically stated that oxygen should not be used since it causes burning of the feedstock. Nevertheless, by employing controlled amounts of oxygen, i.e., oxygen in insufficient amount to cause substantial burning, the advantages mentioned herein can be obtained.

SUMMARY OF THE INVENTION

In accordance with this invention, therefore, an improved process is provided for the vapor phase dehydrogenation of dehydrogenatable organic compounds which comprises reacting the dehydrogenatable compound with a sulfur oxide and oxygen, the oxygen being present in an amount insufficient to cause substantial burning of the dehydrogenatable compound. Preferably, the reaction is carried out in the presence of a low surface catalyst and in the presence of an inert diluent.

While not wishing to be bound by an particular theory it is believed that the presence of the oxygen in the reaction zone tends to (a) regenerate sulfur oxide which is employed as the dehydrogenating agent and (b) burn off a substantial quantity of coke that may have been formed. Thus, while the dehydrogenation reaction proceeds in a manner illustrated by Equation 1 above, it is noticed that the products of the reaction, in addition to the dehydrogenated feed, are water and hydrogen sulfide. The latter product, however, can be readily oxidized back to $SO_2$ or $SO_3$:

$$H_2S + 1.5O_2 \rightarrow SO_2 + H_2O \qquad (2)$$
$$H_2S + 2O_2 \rightarrow SO_3 + H_2O \qquad (3)$$

thereby regenerating the dehydrogenating agent. Consequently, less sulfur oxide need be introduced into the reaction zone. This regeneration reaction, however, must rely on the preferential reaction of the oxygen with the $H_2S$. If the oxygen reacts primarily with feed, burning will occur and the process will not be attractive either technically or economically. In order to insure that the oxygen reacts preferentially with the hydrogen sulfide, only controlled amounts of oxygen are employed, i.e., an amount insufficient to cause substantial burning of the dehydrogenatable feed compound.

More specifically and using sulfur dioxide as an illustrative example, Equation 1 above shows that one-third mole of sulfur dioxide is theoretically required to abstract one mole of hydrogen from a dehydrogenatable organic compound. Nevertheless, the art has generally utilized much greater sulfur dioxide levels in order to obtain economically desirable conversions and yield levels. Of course, as mentioned, since sulfur oxides also tend to promote heavy product formation and coking, lowered sulfur oxide levels are clearly advantageous. Table 1 below shows the sulfur oxide levels that can be used in accordance with this invention.

TABLE I

|  | Broad range | Preferred | Most preferred |
|---|---|---|---|
| Mol $SO_2$/mol $H_2$ abstracted | 0.01–1.0 | 0.2–1.0 | 0.2–0.5 |
| Mol $SO_3$/mol $H_2$ abstracted | 0.007–1.0 | 0.15–1.0 | 0.15–0.4 |

It is noted that these ratios are reported in terms of the number of moles of hydrogen abstracted (dehydrogenation occurs by the abstracting of hydrogen). This method is believed to be the most meaningful reporting method, since, for example, in the dehydrogenation of butane to butene one mole of hydrogen is abstracted while in the dehydrogenation of butane to butadiene or of ethane to acetylene two moles of hydrogen are abstracted. Thus, depending upon the extent of dehydrogenation desired the amount of sulfur oxide dehydrogenating agent employed will vary proportionately with the ranges shown in Table I.

Additionally, the dehydrogenation agent can be sulfur dioxide, sulfur trioxide or mixtures thereof; or these agents can be supplied to the reaction zone as their respective water solutions, i.e. $H_2SO_3$, $H_2SO_4$. In the latter case, the molar ratios will be based on the amount of the dehydrogenating agent in the water solution. Generally, however, sulfur dioxide is the preferred agent.

As noted, the oxygen levels employed herein must be carefully controlled in order to insure against substantial burning of the feedstock. Thus, even though the amount of sulfur oxide employed can be decreased as the oxygen level increases, the rate of burning of the feed also increases with increasing oxygen levels. Oxygen levels which will accomplish the desired results, i.e., increase yields, conversions, catalyst life and/or decrease sulfur oxide level and not lead to substantial burning of the feed, regardless of the sulfur oxide employed, are generally not greater than about 0.2 mol/mol of hydrogen to be abstracted. Low end limits are not generally important since any amount of oxygen will aid the process, the only requirement being that some oxygen be provided in the reaction zone. Preferably, however, oxygen levels should range from about 0.01 to 0.2 mol/mol of hydrogen to be abstracted, and more preferably about 0.05 to 0.2 mol/mol of hydrogen to be abstracted. Of course, the oxygen can be supplied as oxygen per se, or as air, or diluted with other inert gases such as steam, helium, argon, carbon dioxide, and the like.

Now, since both oxygen and sulfur oxides are oxidizing agents another method for specifying the levels of these materials in the reaction zone is by reference to total oxidant. This method is particularly applicable where the credit obtained by using the oxygen is taken in the reduction of the level of sulfur oxide employed. (The credit can also be taken as an increase in conversion and yield at constant sulfur oxide levels and, when conditions are optimized both advantages can be obtained.) Thus, it can be stated that the preferred total oxidant should not be greater than about 0.7 mol/mol of hydrogen abstracted while the amount of oxygen is not greater than 0.2 mol/mol of hydrogen abstracted.

The process of this invention can be applied to a great variety of dehydrogenatable organic compounds to obtain the unsaturated derivatives thereof. A suitable dehydrogenatable compound can be any organic compound that contains at least one

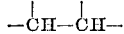

grouping, i.e., adjacent carbon atoms bonded to each other and each attached to at least one hydrogen atom. Preferably, such compounds have from 2 to about 20 carbon atoms. In addition to carbon and hydrogen, these compounds may also contain oxygen, halogens, nitrogen, and sulfur. Among the classes of organic compounds which can be dehydrogenated by this process are: alkanes, alkenes, alkyl halides, ethers, esters, aldehydes, ketones, organic acids, alkyl aromatic compounds, alkyl heterocyclics, cyanoalkanes, cyanoalkenes, and the like. Illustrative applications include: ethylbenzene to styrene, isopropyl benzene to α-methyl styrene, cyclohexane to benzene, vinyl cyclohexane or vinyl cyclohexene to styrene, ethane to ethylene, n-butane to butenes and butadiene, butene to butadiene, isobutane to isobutylene, methyl butene to isoprene, propionaldehyde to acrolein, ethyl chloride to vinyl chloride, propionitrile to acrylonitrile, methyl isobutyrate to methyl mathacrylate, propionic acid to acrylic acid, ethyl pyridine to vinyl pyridine, and the like. Preferred dehydrogenatable feed stocks are the $C_2$–$C_{20}$ hydrocarbons, i.e., paraffins, alkyl benzenes, alkyl and alkenyl substituted cycloaliphatic compounds, and monoolefins. Particularly preferred, however, are $C_2$–$C_9$ paraffins $C_3$–$C_9$ monoolefins, $C_8$–$C_{16}$ alkyl benzenes, and $C_8$–$C_{16}$ alkyl and alkenyl substituted cycloaliphatic compounds, still more particularly $C_4$–$C_8$ monoolefins and paraffins, $C_8$–$C_{10}$ alkyl benzenes, and $C_8$–$C_{10}$ alkyl and alkenyl substituted cycloaliphatic compounds. Particularly effective as feed stocks are the olefinic hydrocarbons or alkyl benzenes or vinyl substituted cycloaliphatics which may be dehydrogenated to provide a product wherein the major unsaturated product has the same number of carbon atoms as the feed hydrocarbon. Ethylbenzene is a particularly preferred dehydrogenatable compound and its reaction with sulfur dioxide in accordance herewith results in ethylbenzene conversions in excess of 80%, preferably 85%, with selectivity to styrene in excess of 85%, preferably 90%, resulting in styrene yields in excess of 75%, preferably in excess of 80%.

In yet another embodiment, dehydrocyclization can also be effected. Thus, $C_6$–$C_8$ paraffins, e.g., hexane, heptan, octane, can be converted into $C_6$–$C_8$ aromatics, e.g. benzene, toluene, ethylbenzene, paraxylene.

The inert diluent which may be employed to reduce the partial pressure if the reactants may be any gas normally inert under the conditions of the reaction. Illustrative of the gases that may be employed are; helium, nitrogen, carbon monoxide, carbon dioxide, steam, etc., as well as methane, waste gases containing methane, and mixtures of the foregoing. Preferably, however, the diluent is steam ir a mixture of diluents which is primarily steam, e.g., steam and helium, steam and nitrogen, steam and carbon dioxide, etc.

The molar ratio of inert diluent to dehydrogenatable compound is not critical and may vary over a wide range as long as at least about 1 mole of diluent per mole of dehydrogenatable compound is present. This value, however, is merely an arbitrary limit at which the yield of dehydrogenated product becomes practical and economical. Molar ratios below this value will also show increases in yield, generally the conversion and yield increasing with increased dilution of the sulfur oxide. The upper limit is not at all critical and larger amounts if diluent will only serve to further reduce the partial pressure of the reactants. Preferably, however, a molar ratio of 1 to 20, more preferably 1 to 8, of diluent to dehydrogenatable compound is employed. It will be obvious to one skilled in the art that this same result can be accomplished by operating under reduced pressures. However, use of an inert diluent is preferred, since it alleviates problems of vacuum equipment.

The conditions under which the reaction is effected are not generally critical and can be the conditions under which normal vapor phase catalytic dehydrogenation reactions are effected. Thus, reactions temperatures should be at least about 700° F., preferably 80 to 1500° F., and more preferably 900 to 1200° F. Similarly, pressures may vary widely and can range from subatmospheric, e.g., 0.1 atmosphere, to superatmospheric, e.g., 50 atmospheres or higher. Preferably, however, pressures may range from about 1 to 3 atmospheres.

As previously mentioned, it is highly desirable to employ low surface area catalysts for the reaction described herein. The low surface area requirement is necessitated by the fact that the catalyst must be selective to the desired reaction while minimizing undesired side reactions such as cracking and/or burning (high surface area catalyst promote burnng and/or cracking). Various catalysts can be employed which satisfy the low surface area criterion, among which are those that are or could be employed as catalyst support materials. These catalysts can also be described as difficulty reducible oxides or refractory oxides or mixtures of oxides and can be selected from the oxides of metals of Groups II–VIII of the Periodic Chart of the Elements, preferably of Groups II–A, III–A, IV–A, IV–B, V–B, VI–B and VII–B and most preferably Groups II–A, III–A, IV–A, IV–B and V–B. Suitable examples of such materials are magnesia, barium oxide, thoria, alumina, boria, vanadia, chromia, titania, silica, silica-alumina, tungsten oxide, zirconia, hafnium oxide and the like. Of these, silica, alumina, vanadia, magnesia, and titania are more preferred, particularly alumina and titania. It will be recognized that these catalysts need not start out as oxides but may be converted to the oxides during the course of the reaction. For example nitrate or hydroxide salt is readily converted to its corresponding oxide at reaction temperatures.

Another class of catalysts applicable to this invention and highly preferred are those based on titanium and oxygen, i.e., titanates. These catalysts have shown exceptional stability and give good yields of the desired dehydrogenated products. Applicable titanates are those wherein any metal from Groups I–VIII of the Periodic Chart of the Elements is combined with titanium and oxygen. Typically active titanates are: lithium titanate, barium titanate, cerium titanate, nickel titanate, lead titanate, strontium titanate, and the like. It is noted that titanium metal, by itself, can also be employed successfully.

Addiionally, such common support materials as silicon carbide; carbon, e.g., coke, graphites; diatomaceous earths, e.g., kieselguhr; clays, both natural and synthetic, e.g., attapulgite clays; magnesium silicates; phosphates, e.g., calcium nickel phosphate, aluminum phosphate; and the like which are of low surface area can also be employed, although somewhat less effectively than the other materials listed hereinabove.

Of course, all of the catalysts mentioned hereinabove are low surface area catalysts (as measured by nitrogen adsorption) and can be successfully employed in the dehydrogenation process. Nevertheless, it has also been found that a critical surface area range exists for many catalysts within which the yield of dehydrogenated product is markedly greater than would ordinarily be expected as reported in Ser. No. 780,528. Thus, for example, alumina catalysts have a critical surface area range starting above a threshold surface area of about 0.6 m.$^2$/gram where the yield of dehydrogenated product increases by about tenfold. While a critical upper limit where product yield falls off sharply does not exist as such, the increasing make of by-products and increased coking which accompany increasing surface area establishes a critical upper limit above which it becomes uneconomical to proceed with the reaction. Consequently, it is preferred that alumina catalysts have a surface area ranging from about 0.6 to 100 m.$^2$/gm., preferably about 0.6 to 50 m.$^2$/gm., and more preferably about 0.6 to 30 m.$^2$/gm.

The exact surface area levels for the catalysts which result in markedly increased product yields are not known with exactitude because of the many and varied catalysts which can be employed herein. Nevertheless, it is believed that one skilled in the art can readily determine these levels, particularly since the levels are thought to be rather similar to that determined for alumina, i.e., at least above about 0.5–1.0 m.$^2$/gram.

Now, it can be generally said that the higher the surface area, the more the coking and burning, the higher the quantity of sulfur oxide required for a given yield, and the lower the catalyst life. Taking these directions into consideration, lower surface areas are to be preferred and surface areas that are readily usable in the process of this invention, regardless of catalyst material, should range from about 0.1 m.$^2$/gm. to about 100 m.$^2$/gm., preferably 0.1 to 70 m$^2$./gm., more preferably about 0.5 to 50 m.$^2$/gm., again keeping in mind minor variations depending upon choice of catalyst.

In another embodiment hereof, it has been found that a catalyst which incorporates a minor proportion of a metal or a metal salt, e.g., halides, phosphates, sulfates, etc., oxide, or hydroxide of an alkali or alkaline earth metal or of palladium promotes an increase in the yield of dehydrogenated product as well as markedly increasing the life of the catalyst. Many of these salts, oxides, hydroxides or metals may change during the preparation of the catalyst, during heating in the reactor, prior to, or during the reaction or are converted to another form under the reaction conditions, but such materials still function as effective catalysts in this process. For example, many metals, metal nitrates, nitrites, carbonates, hydroxides, acetates, sulfites, sulfides, and the like, may be readily converted to the corresponding oxide under the defined reaction conditions. Salts such as phosphates, silicates and halides are stable at reaction conditions, and are also effective in increasing catalyst life. At any rate, the catalysts are effective, if the listed metals or their compounds are present in a catalytic amount in contact with reaction gases. Preferred are the oxides and chlorides of the listed metals, as well as the metals themselves. Of the alkali metals, i.e., lithium, sodium, potassium, rubidium, and cesium, it is preferred to utilize sodium or potassium as the metals or derivatives thereof, most preferably sodium. Of the alkaline earth metals, i.e., beryllium, magnesium, calcium, strontium, and barium, it is preferred to utilize calcium or barium as the metals or derivatives thereof, most preferably barium. It is also noted that palladium, e.g., palladium chloride, acts similarly as the alkali or alkaline earth metals with regard to increasing both yield and catalyst life. While, generally, all of the metals will increase catalyst life, sodium and barium are particuarly preferred since they are significantly effective in increasing yield in addition to increasing catalyst life. The amount of this added material is not generally critical and usually any amount will be helpful. Preferably, however, the added material will make up about 0.05 to 40 wt. percent of the catalyst, more preferably about 0.3 to 10 wt. percent.

In a typical reaction sequence, ethylbenzene, sulfur dioxide, oxygen and steam diluent are preheated and passed into a suitable reactor containing an alumina catalyst with a minor amount of sodium oxide. After the desired conversion is achieved, the reaction products are quenched to 500° F. at which temperature any sulfur formed is liquefied, drawn off and burned to $SO_2$ for recycle. The remaining effluent is further quenched to condense water and liquid hydrocarbons. The $H_2S$ in the off gas containing $H_2S$ and $CO_2$ is converted to sulfur and thence to $SO_2$ for recycle. Water is separated from the hydrocarbon and the hydrocarbon product is purified by distillation. Unreacted ethylbenzene is recycled to the reactor and pure styrene is kept for further use.

In the case where the hydrocarbon product is gaseous e.g. as in the dehydrogenation of butene to butadiene, the reaction sequence is similar except separation of the hydrocarbon from the off gas is carried out by absorption and stripping and the purification of the hydrocarbon product is carried out by conventional means.

Having now described the invention, the following examples will further illustrate the process. However, no limitations are to be implied from these examples since variations and modifications thereof will be apparent to those skilled in the art.

The examples described below were carried out by metering ethylbenzene, water, sulfur dioxide and oxygen into a 1 inch diameter vycor or stainless steel tube. The feed components were preheated to reaction temperature in the upper part of the tubular reactor and then contacted with a heated bed of suitable catalyst. Reaction products were withdrawn from the bottom of the reactor and quenched to condense the water, sulfur and liquid hydrocarbons. These were removed from the gaseous products in a separator and the water-sulfur layer and hydrocarbon layer were weighed separately. The hydrocarbon product was analyzed by gas chromatography. The off gas from the top of the separator passed through a bubble meter to measure its rate, a bomb for measurement of density, and then to a gas chromatograph for analysis. From these measurements a complete weight and material balance was obtained.

EXAMPLE 1

Table II below shows the results of an ethylbenze dehydrogenation over a titania catalyst with 1.9 wt. percent barium oxide but without the use of a sulfur oxide dehydrogenation agent.

TABLE II

Space velocity=0.3 w./w./hr.; temperature 1,000° F. Mole ratio $EB/O_2/He/other$ diluent=1/0.45/1.6/2.4

| | EB conversion in mole percent | Styrene Selectivity, in mole percent | Styrene Yield, in mole percent |
|---|---|---|---|
| Other diluent: | | | |
| $H_2O$ | 13.7 | 80 | 11 |
| He | 15.5 | 88 | 13.7 |

Clearly the results show that oxygen, by itself, is not an economically attractive dehydrogenating agent, the conversion and yield being quite low.

EXAMPLE 2

Table III below shows the effect of adding oxygen to an ethylbenzene dehydrogenation reaction when sulfur dioxide is employed as the dehydrogenating agent.

TABLE III

Catalyst=99.5% $Al_2O_3$—0.5% $Na_2O$ (S.A.=~3m.²/g. Temperature equals 1,175° F. EB space velocity=0.3 w./w./hr. $EB/He/H_2O$=1/1/3

| $SO_2/HC$ | $O_2/HC$ | EB conversion, percent | Styrene selectivity, percent | Styrene yield, percent |
|---|---|---|---|---|
| .33 | | 73 | 92 | 67 |
| .33 | .1 | 74 | 94 | 70 |
| .33 | .2 | 79 | 93 | 73 |
| .45 | | 88 | 91 | 80 |
| .45 | .1 | 90 | 92 | 83 |

This table shows that providing oxygen with $SO_2$ in the reaction zone has the effect of increasing styrene yield. Addition of small quantities of oxygen increases conversion and also causes an increase in selectivity. If, however, large quantities of oxygen are added, e.g. greater than about 0.2 mole/mole ethylbenzene, selectivity is lowered due to burning of the feed and formation of carbon oxides.

EXAMPLE 3

Table IV below shows that some of the sulfur dioxide dehydrogenating agent can be replaced with oxygen without loss of styrene yield, in the dehydrogenation of ethylbenzene.

TABLE IV

Catalyst=99.5% $Al_2O_3$—0.5% $Na_2O$ (S.A.=~3 m.²/g.) Space velocity=0.3 w./w./hr. $EB/He/H_2O$ mole ratio=1/1/3

| Moles/mole, ethylbenzene | | EB conversion, percent | Styrene selectivity, percent | Styrene yield, percent |
|---|---|---|---|---|
| $SO_2$ | $O_2$ | | | |
| 0.45 | None | 86.1 | 92.9 | 80.0 |
| 0.52 | do | 91.2 | 91.6 | 83.6 |
| 0.45 | 0.08 | 90.0 | 92.9 | 83.5 |

These results clearly show that the presence of the oxygen allows a reduction of the amount of dehydrogenating agent that is employed without sacrificing such product. Thus, the use of oxygen can be taken in two ways (1) to increase yields, and/or (2) to lower the sulfur oxide requirement.

EXAMPLE 4

Table V below shows a life test on a catalyst for the dehydrogenation of ethylbenzene to styrene.

TABLE V

Catalyst=200 grams, 99.5% $Al_2O_3$—0.5% $Na_2O$ (S.A.=~3m.²/g.) $EB/SO_2/O_2/H_2O$=1/0.43/0.1/4; temperature=1,175° F. EB space velocity=0.3 w./w./hr.

| | EB conversions, percent | Styrene selectivity, percent | Styrene yield, percent |
|---|---|---|---|
| Run time hours: | | | |
| 1-3 | 91 | 86 | 78 |
| 5-7 | 93 | 88 | 82 |
| 7-11 | 91 | 88 | 80 |
| 11-15 | 91 | 88 | 80 |
| 15-19 | 89 | 88 | 78 |
| 19-23 | 86 | 93 | 80 |
| 23-27 | 84 | 90 | 76 |
| 27-31 [1] | 84 | 87 | 73 |

[1] Coke on catalyst at end of run=7.4% (=0.8% of EB fed to unit).

This table shows that using $SO_2/O_2$ mixtures, long run lengths can be achieved before catalyst regeneration becomes necessary.

EXAMPLE 5

In a run similar to that in Example 4, ethylbenzene was dehydrogenated to styrene with and without added oxygen. The results are shown in Table VI below.

TABLE VI.—$Al_2O_3$ Catalyst

Temperature=1,175° F.; S.V.=0.3 w./w./hours $EB/SO_2/He/H_2O$=1/.4/.5/3.5

| $O_2$:HC | Time, hours | Conversion | Selectivity | Yield |
|---|---|---|---|---|
| | 4 | 85 | 92 | 78 |
| | 29 | 75 | 91 | 68 |
| 0.1 | 6 | 89 | 91 | 81 |
| 0.1 | 29 | 78 | 91 | 71 |

Addition of 0.1 mole $O_2$/mole HC causes an increase in conversion of 3–4% at no loss in selectivity. This yield advantage is maintained for 30 hours. Thus, this data clearly shows that added oxygen can result in both increased product make and longer run times.

EXAMPLE 6

Table VII below shows the effect of varying the diluent ratio in the dehydrogenation of ethylbenzene.

TABLE VII

Catalyst=$Al_2O_3$; Temperature=1,175° F. S.V.=0.3 w./w./hr.; Pressure=20 p.s.i.g. $EB/SO_2/O_2/He$=1/0.4/0.1/1

[Effect of $H_2O$ diluent ratio]

| $H_2O$ diluent, mole ratio | Conversion | Selectivity | Yield |
|---|---|---|---|
| 2 | 83 | 78 | 65 |
| 4 | 86 | 86 | 74 |
| 6 | 91 | 89 | 81 |
| 8 [1] | 81 | 93 | 75 |

[1] 75% yield maintained for 24 hours.

This table shows that a 20 p.s.i.g. pressure optimum $H_2O$ diluent concentration is about 6 moles/mole EB. Above this concentration a water poisoning effect shows and yields drop off slightly. An increase in temperature at the high water level should bring the yield of styrene back up.

What is claimed is:

1. A process for the dehydrogenation of a dehydrogenatable organic compound which comprises reacting, in the vapor phase a feed mixture consisting essentially of a dehydrogenatable organic compound, a sulfur oxide, and oxygen, the oxygen being present in an amount insufficient to cause substantial burning of the dehydrogenatable organic compound, the reaction being effected at a temperature in excess of about 700° F. and in the presence of a low surface area catalyst.

2. The process of claim 1 wherein the dehydrogenatable organic compound contains at least one

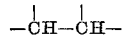

grouping.

3. The process of claim 1 wherein the sulfur oxide is sulfur dioxide and is supplied in an amount ranging from about 0.01 to about 1.0 mole per mole of hydrogen to be abstracted from the dehydrogenatable organic compound.

4. The process of claim 1 wherein the sulfur oxide is sulfur trioxide and is supplied in an amount ranging from about 0.007 to about 1.0 mole per mole of hydrogen to be abstracted from the dehydrogenatable organic compound.

5. The process of claim 1 wherein the catalyst is selected from the group consisting of metals, salts, oxides and mixtures of oxides of Group II–VIII metals and has a surface area ranging from about 0.1 to about 100 m.$^2$/gm.

6. The process of claim 1 wherein the oxygen is supplied in an amount no greater than about 0.2 mole per mole of hydrogen to be abstracted from the dehydrogenatable organic compound.

7. A process for the dehydrogenation of a dehydrogenatable organic compound which comprises reacting, in the vapor phase, a feed mixture consisting essentially of a $C_2$–$C_{20}$ hydrocarbon having at least one

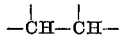

grouping, sulfur dioxide in an amount of about 0.01 to about 1.0 mole per mole of hydrogen to be abstracted from the hydrocarbon, oxygen in an amount insufficient to cause substantial buring of the hydrocarbon and in an amount no greater than about 0.2 mole of oxygen per mole of hydrogen to be abstracted from the hydrocarbon, and an inert diluent, the molar ratio of the inert diluent to hydrocarbon being at least about 1/1, the reaction being effected at a temperature ranging from about 800° F. to about 1500° F., in the presence of a low surface area catalyst selected from the group consisting of metals, salts, oxides and mixtures of oxides of Group II–VIII metals, the catalyst having a surface area ranging from about 0.1 to about 100 m.$^2$/gm.

8. The process of claim 7 wherein the hydrocarbon is selected from the group consisting of $C_4$–$C_8$ paraffins and monoolefins, $C_8$–$C_{10}$ alkyl benzenes, and $C_8$–$C_{10}$ alkyl and alkenyl cycloaliphatics.

9. The process of claim 8 wherein the sulfur dioxide is supplied in an amount ranging from about 0.2 to 1.0 mole per mole of hydrogen to be abstracted from the hydrocarbon.

10. The process of claim 8 wherein the oxygen is supplied in an amount ranging from about 0.01 to about 0.2 mole per mole of hydrogen to be abstracted from the hydrocarbon.

11. The process of claim 8 wherein the catalyst also contains a member selected from the group consisting of metals, salts, oxides, and hydroxides of alkali metals and alkaline earth metals.

12. The process of claim 8 wherein the catalyst is alumina.

13. The process of claim 12 wherein the alumina has a surface area in excess of about 0.6 m.$^2$/gm.

14. The process of claim 8 wherein the catalyst is titania.

15. The process of claim 8 wherein the catalyst is a titanate.

16. The process of claim 8 wherein the total oxidant supplied to the reaction is not greater than about 0.7 mole per mole of hydrogen to be abstracted from the hydrocarbon but the amount of oxygen supplied to the reaction does not exceed about 0.2 mole per mole of hydrogen to be abstracted from the hydrocarbon.

17. The process of claim 8 wherein the low surface area catalyst is magnesia.

References Cited

UNITED STATES PATENTS

| | | | |
|---|---|---|---|
| 2,418,374 | 4/1947 | Stone | 260—680 |
| 2,720,550 | 10/1955 | Danforth | 260—680 |
| 2,867,677 | 1/1959 | Murray | 260—683.3X |
| 3,299,155 | 1/1967 | Adams | 260—669 |
| 3,403,192 | 9/1968 | Vadekar et al. | 260—669 |
| 3,456,026 | 7/1969 | Cohen | 260—669 |

CURTIS R. DAVIS, Primary Examiner

U.S. Cl. X.R.

260—680E, 683.3